United States Patent
Hoshino et al.

(10) Patent No.: US 9,321,246 B2
(45) Date of Patent: *Apr. 26, 2016

(54) COLD ROLLED STEEL SHEET

(75) Inventors: Katsuya Hoshino, Chiyoda-ku (JP);
Shinji Ootsuka, Chiyoda-ku (JP);
Takayoshi Yano, Chiyoda-ku (JP);
Tatsuya Miyoshi, Chiyoda-ku (JP)

(73) Assignee: JFE Steel corporation, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 13/824,772

(22) PCT Filed: Sep. 27, 2011

(86) PCT No.: PCT/JP2011/071956
§ 371 (c)(1),
(2), (4) Date: May 30, 2013

(87) PCT Pub. No.: WO2012/043511
PCT Pub. Date: Apr. 5, 2012

(65) Prior Publication Data
US 2014/0147663 A1 May 29, 2014

(30) Foreign Application Priority Data
Sep. 29, 2010 (JP) ................................. 2010-217990

(51) Int. Cl.
| | |
|---|---|
| *B32B 15/06* | (2006.01) |
| *B32B 15/18* | (2006.01) |
| *C10M 169/04* | (2006.01) |
| *C08G 18/64* | (2006.01) |
| *C08G 18/80* | (2006.01) |
| *C09D 175/04* | (2006.01) |
| *C09D 175/06* | (2006.01) |
| *C10M 111/04* | (2006.01) |
| *B05D 1/28* | (2006.01) |

(52) U.S. Cl.
CPC .............. *B32B 15/06* (2013.01); *B32B 15/18* (2013.01); *C08G 18/643* (2013.01); *C08G 18/8061* (2013.01); *C09D 175/04* (2013.01); *C09D 175/06* (2013.01); *C10M 111/04* (2013.01); *C10M 169/04* (2013.01); *B05D 1/28* (2013.01); *B05D 2202/10* (2013.01); *C10M 2201/062* (2013.01); *C10M 2201/0623* (2013.01); *C10M 2201/081* (2013.01); *C10M 2201/082* (2013.01); *C10M 2201/084* (2013.01); *C10M 2201/1023* (2013.01); *C10M 2207/122* (2013.01); *C10M 2207/1233* (2013.01); *C10M 2207/1273* (2013.01); *C10M 2207/141* (2013.01); *C10M 2207/1423* (2013.01); *C10M 2209/0845* (2013.01); *C10M 2209/1023* (2013.01); *C10M 2209/1033* (2013.01); *C10M 2217/0453* (2013.01); *C10M 2219/042* (2013.01); *C10M 2229/02* (2013.01); *C10N 2210/02* (2013.01); *C10N 2210/03* (2013.01); *C10N 2210/05* (2013.01); *C10N 2210/06* (2013.01); *C10N 2210/08* (2013.01); *C10N 2230/06* (2013.01); *C10N 2240/402* (2013.01); *C10N 2240/405* (2013.01); *C10N 2240/408* (2013.01); *C10N 2240/58* (2013.01); *C10N 2250/121* (2013.01); *C10N 2280/00* (2013.01); *Y10T 428/265* (2015.01)

(58) Field of Classification Search
None
See application file for complete search history.

(56) References Cited

U.S. PATENT DOCUMENTS

| | | | |
|---|---|---|---|
| 6,129,995 A | 10/2000 | Hashimoto et al. | |
| 6,589,603 B1 | 7/2003 | Cornell | |
| 6,837,925 B2 * | 1/2005 | Kubo et al. | 106/486 |
| 7,238,288 B1 * | 7/2007 | Gao et al. | 210/688 |
| 2006/0194008 A1 | 8/2006 | Schwartz | |
| 2007/0213445 A1 | 9/2007 | Klijn et al. | |
| 2008/0021115 A1 | 1/2008 | Ikematsu | |
| 2009/0032144 A1 | 2/2009 | McMillen | |
| 2011/0076488 A1 | 3/2011 | Lee et al. | |

(Continued)

FOREIGN PATENT DOCUMENTS

| | | |
|---|---|---|
| CN | 1134557 | 1/2004 |
| CN | 1906254 A | 1/2007 |

(Continued)

OTHER PUBLICATIONS

Sharma et. al. Journal of Molecular Catalyst A:Chemical 286, 2008, 55-62.*
Supplementary European Search Report dated Jun. 4 2014, application No. EP 11 82 9064.
International Search Report for International Application No. PCT/JP2011/071956 dated Dec. 27, 2011.

(Continued)

*Primary Examiner* — Vera Katz
(74) *Attorney, Agent, or Firm* — RatnerPrestia

(57) ABSTRACT

In order to obtain a cold rolled steel sheet having excellent press formability, a cold rolled steel sheet has, on a surface thereof, an organic-inorganic composite film containing: an organic resin; and a crystalline layered material. The organic-inorganic composite film has an average film thickness of 0.10 to 2.0 μm and contains 0.5 part or more by weight of the crystalline layered material as a solid with respect to 100 parts by weight of a solid of the organic resin. The crystalline layered material preferably is, for example, a layered double hydroxide represented by $[M^{2+}_{1-x}M^{3+}_x(OH)_2][A^{n-}]_{x/n}\cdot zH_2O$, where: $M^{2+}$ is one or more of $Mg^{2+}$, $Ca^{2+}$, $Fe^{2+}$, $Ni^{2+}$, and $Zn^{2+}$; $M^{3+}$ is one or more of $Al^{3+}$, $Fe^{3+}$, and $Cr^{3+}$; and $A^{n-}$ is one or more of $OH^-$, $CO_3^{2-}$, $Cl^-$, and $(SO_4)^{2-}$.

2 Claims, 2 Drawing Sheets

(56) References Cited

U.S. PATENT DOCUMENTS

| | | | |
|---|---|---|---|
| 2012/0082845 A1 | 4/2012 | Makimizu | |
| 2012/0321908 A1 | 12/2012 | Hoshino | |
| 2013/0260141 A1* | 10/2013 | Hoshino et al. | 428/336 |
| 2014/0147663 A1 | 5/2014 | Hoshino | |

FOREIGN PATENT DOCUMENTS

| | | |
|---|---|---|
| CN | 101720344 A | 6/2010 |
| EP | 1 749 866 A1 | 2/2007 |
| EP | 1 840 113 A1 | 10/2007 |
| EP | 2 505 351 A1 | 10/2012 |
| JP | 5360332 | 5/1978 |
| JP | 54112731 | 9/1979 |
| JP | 598354 | 1/1984 |
| JP | 2190483 | 7/1990 |
| JP | 3191093 | 8/1991 |
| JP | 4-44840 | 2/1992 |
| JP | 4088196 | 3/1992 |
| JP | 07180064 | 7/1995 |
| JP | 1025596 | 1/1998 |
| JP | 11-158436 | 6/1999 |
| JP | 11151778 | 6/1999 |
| JP | 2001-234119 | 8/2001 |
| JP | 2002-307613 | 10/2002 |
| JP | 2005178213 | 7/2005 |
| JP | 2005-298694 | 10/2005 |
| JP | 2006274385 | 10/2006 |
| JP | 2007-39549 | 2/2007 |
| JP | 2007-275706 | 10/2007 |
| JP | 2008055732 | 3/2008 |
| JP | 2008081808 | 4/2008 |
| JP | 2009-516017 | 4/2009 |
| JP | 201059513 | 3/2010 |
| JP | 2011-131586 | 7/2011 |
| KR | 2009-0119403 A | 11/2009 |
| WO | 02068329 | 9/2002 |
| WO | WO 2005/071023 A1 | 8/2005 |
| WO | 2009031699 | 3/2009 |
| WO | WO 2009/139590 | 11/2009 |
| WO | WO 2009/139590 A2 | 11/2009 |

OTHER PUBLICATIONS

International Search Report for International Application No. PCT/JP2011/072153 dated Nov. 22, 2011.
Entire patent prosecution history of U.S. Appl. No. 13/825,443, filed Jun. 7, 2013, entitled, "Cold Rolled Steel Sheet."
Entire patent prosecution history of U.S. Appl. No. 13/511,229, filed Sep. 5, 2012, entitled, "Galvanized Steel Sheet."
B.R. Venugopal, Layered Double Hydroxide-CdSe Quantum Dot Composites through Colloidal Processing, J. Phy. Chem: American Chemical Society, 2006, 100, pp. 772-776.
JP 2010059513 Machine Translation dated Mar. 18, 2010.
Office Action mailed Jan. 21, 2015 in U.S. Appl. No. 13/825,443.
Canadian Office Action mailed Apr. 9, 2015 for Canadian Office Action 2,813,070.
Chinese Office Action mailed Nov. 17, 2014 in Chinese Application No. 201180046632.6.
Final Office Action mailed Jan. 21, 2015 in U.S. Appl. No. 13/825,443.
Japanese Office Action mailed Jul. 15, 2014 for Japanese Application No. 2010-217991.
Japanese Office Action mailed Mar. 31, 2015 for Japanese Application No. 2010-217991.
Korean Office Action mailed Apr. 8, 2014 for Korean Application No. 10-2013-7005828.
Korean Office Action mailed Nov. 18, 2014 in Korean Application No. 10-2013-7005828.
Japanese Office Action mailed Sep. 9, 2014 for Japanese Application No. 2010-217990.
Mexican Office Action mailed Jun. 1, 2015 for Mexican Application No. MX/a/2013/003377.
Mexican Office Action mailed Oct. 29, 2014 for Mexican Application No. MX/a/2013/003377.

* cited by examiner

COLD ROLLED STEEL SHEET

CROSS REFERENCE TO RELATED APPLICATIONS

This application is the U.S. National Phase application of PCT International Application No. PCT/JP2011/071956, filed Sep. 27, 2011, and claims priority to Japanese Patent Application No. 2010-217990, filed Sep. 29, 2010, the disclosure of both applications being incorporated herein by reference in their entireties for all purposes.

FIELD OF THE INVENTION

The present invention relates to a cold rolled steel sheet having excellent press formability.

BACKGROUND OF THE INVENTION

Cold rolled steel sheets are widely used in various fields with a focus on uses in automotive bodies. For such uses, they are subjected to press-forming to be made available for use. In particular, from a viewpoint of recent strengthening of $CO_2$ emission regulations, usage ratios of high-strength steel sheets tend to increase with the aim to reduce weights of automotive bodies. However, of cold rolled steel sheets, for those having a base material with a strength exceeding 440 MPa, the higher the strength of the base material, the higher the contact pressure during press forming becomes and the more the hardness of the cold rolled steel sheet approaches the hardness of a mold, and thus, there is a problem in that scratches called mold galling are likely to occur, which are formed by a cold rolled steel sheet being galled by a mold. More specifically, during continuous press forming, molds are severely worn down, and this adversely affects productivity of automobiles, by ruining the appearance of molded articles, for example.

As a method for suppressing the occurrence of mold galling in cold rolled steel sheets, a surface treatment on molds is widely used. In this method, however, adjustment of molds cannot be performed after a surface treatment. Further, this method has another problem of high cost. Therefore, there is a strong demand for cold rolled steel sheets harder to cause mold galling (with improved mold galling resistance).

A large number of techniques have been reported for forming lubricating films on the surfaces of cold rolled steel sheets. Patent Literature 1 describes a technique for forming on a steel sheet a lubricating film containing: an alkali metal borate; and, as a lubricant, a mixture of zinc stearate and a wax.

Patent Literature 2 describes a technique for forming on a steel sheet a lithium silicate as a film component with a wax and a metallic soap, which are added thereto as lubricants.

Patent Literature 3 describes a lubricant-coated steel sheet in which a polyurethane resin having a silanol group or a hydroxy group is formed with a thickness of 1 to 15 µm, and which has excellent continuous formability in high contact-pressure forming.

PATENT LITERATURE

Patent Literature 1: Japanese Patent Application Laid-open No. 2007-275706

Patent Literature 2: Japanese Patent Application Laid-open No. 2002-307613

Patent Literature 3: Japanese Patent Application Laid-open No. 2001-234119

SUMMARY OF THE INVENTION

Although in Patent Literature 1 to 3, lubricity is achieved by the lubricants or the like contained, required characteristics are not fully satisfied particularly in parts under high contact-pressure like high-strength cold rolled steel sheets.

The present invention provides a cold rolled steel sheet having excellent press formability, by which mold galling is hard to occur and elaborate press forming is possible, for difficult-to-form materials such as a high-strength steel sheet on which the contact pressure increases during press forming.

Much of the lubricity of lubricating films depends on the lubricating performance of a lubricant in the film, and it is considered that development of a novel lubricant is required. The inventors of the present invention have thus diligently performed studies to invent a technique that utilizes deformation caused by an interlayer slip of a crystalline layered material as a lubricating mechanism. If the interlayer slip occurs by a low stress, resistance when the slip occurs is expected to be small even under a high pressure (contact pressure) and excellent lubricity is expected to be achieved. To discover specific crystalline layered materials, substances in which layers are bonded by a weak bonding strength such as an intermolecular force, hydrogen bonding, and electrostatic energy, were extracted. It has been found that by applying predetermined amounts of those extracted crystalline layered materials on surfaces of cold rolled steel sheets, slidability improves dramatically (sliding resistance decreases). Further, it has been found that from a viewpoint of adhesiveness upon applying the crystalline layered materials, it is effective to mix the crystalline layered materials with organic resins to form organic-inorganic composite films. Furthermore, it has been found that, as crystalline layered materials, layered double hydroxides are suitable in which divalent and trivalent metal hydroxides are bonded with anions by electrostatic energy.

The present invention has been made based on the foregoing findings, and a summary of aspects of the invention is provided below.

[1] A cold rolled steel sheet having, on a surface thereof, an organic-inorganic composite film containing: an organic resin; and a crystalline layered material, wherein the organic-inorganic composite film has an average film thickness of 0.10 to 2.0 µm and contains 0.5 part or more by weight of the crystalline layered material as a solid with respect to 100 parts by weight of a solid of the organic resin.

[2] In [1] above, the cold rolled steel sheet characterized in that the crystalline layered material is a layered double hydroxide represented by $[M^{2+}_{1-x}M^{3+}_x(OH)_2][A^{n-}]_{x/n} \cdot zH_2O$, wherein: $M^{2+}$ is one or more of $Mg^{2+}$, $Ca^{2+}$, $Fe^{2+}$, $Ni^{2+}$, $3/4Zr^{4+}$, and $Mo^{3+}$; and $A^{n-}$ is one or more of $OH^-$, $F^-$, $CO_3^{2-}$, $Cl^-$, $Br^-$, $(C_2O_4)^{2-}$, $I^-$, $(NO_3)^-$, $(SO_4)^{2-}$, $(BrO_3)^-$, $(IO_3)^-$, $(V_{10}O_{28})^{6-}$, $(Si_2O_5)^{2-}$, $(ClO_4)^-$, $(CH_3COO)^-$, $[C_6H_4(CO_2)_2]^-$, $(C_6H_5COO)^-$, $[C_8H_{16}(CO_2)_2]^{2-}$, $n(C_8H_{17}SO_4)^-$, $n(C_{12}H_{25}SO_4)^-$, $n(C_{18}H_{37}SO_4)^-$, and $SiO_4^{4-}$.

[3] In [1] above, the cold rolled steel sheet characterized in that the crystalline layered material is a layered double hydroxide represented by $[M^{2+}_{1-x}M^{3+}_x(OH)_2][A^{n-}]_{x/n} \cdot zH_2O$, wherein: $M^{2+}$ is one or more of $Mg^{2+}$, $Ca^{2+}$, $Fe^{2+}$, $Ni^{2+}$, and $Zn^{2+}$; $M^{3+}$ is one or more of $Al^{3+}$, $Fe^{3+}$, and $Cr^{3+}$; and $A^{n-}$ is one or more of $OH^-$, $CO_3^{2-}$, $Cl^-$, and $(SO_4)^{2-}$.

[4] In any of [1] to [3] above, the cold rolled steel sheet characterized in that the organic resin is one or more selected from an epoxy resin, a polyhydroxy polyether resin, a polyester resin, a urethane resin, a silicone resin, and an acrylic resin.

According to the present invention, a cold rolled steel sheet having excellent press formability with a small sliding resistance in a part at which mold galling tends to occur, even when a contact pressure increases during press forming.

DETAILED DESCRIPTION OF EMBODIMENTS OF THE INVENTION

Figure 1:
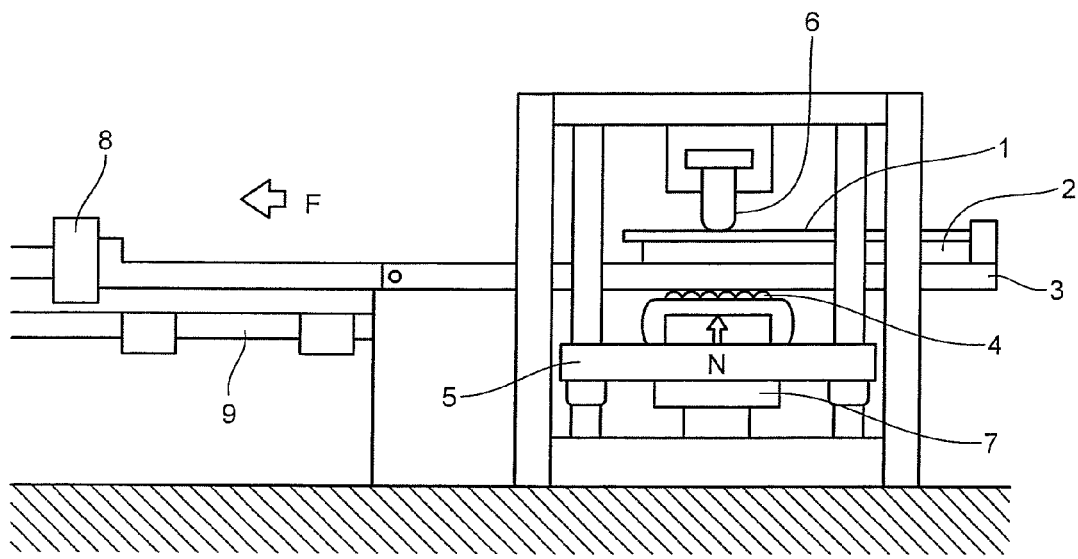
FIG. 1 is a schematic front view of a friction coefficient measuring apparatus.

A cold rolled steel sheet of an embodiment of the present invention has an organic-inorganic composite film containing on a surface of the cold rolled steel sheet an organic resin and a crystalline layered material, and the organic-inorganic composite film has an average film thickness of 0.10 to 2.0 µm and contains 0.5 part by weight or more of the crystalline layered material as a solid with respect to 100 parts by weight of a solid of the organic resin. These are the most important aspects of the cold rolled steel sheet of the present invention.

By coating a predetermined amount of the crystalline layered material on the surface of the cold rolled steel sheet, slidability is improved dramatically. A mechanism of lubrication of the crystalline layered material contained in the organic-inorganic composite film may be understood as follows. When a mold and a cold rolled steel sheet slide, a shear stress is generated on a surface of the cold rolled steel sheet due to an adhesive force between the surfaces of the mold and the cold rolled steel sheet. The presence of a crystalline layered material between the cold rolled steel sheet and the mold causes deformation of the crystalline layered material due to interlayer slips and absorbance of a shear deformation stress generated on the surfaces. Even after the cold rolled steel sheet is worn down and the crystalline layered material is scraped off from the surface of the cold rolled steel sheet, the crystalline layered material adheres to the mold and exhibits an effect of reducing the friction resistance between the mold and the cold rolled steel sheet, and thus even under a high contact-pressure condition supposing a high-strength steel sheet, the effect is achieved sufficiently. Further, containing the organic resin in the organic-inorganic composite film is effective from the viewpoint of adhesiveness upon coating and allows the surface of the cold rolled steel sheet to be coated with the crystalline layered material with a uniform thickness.

The thickness of the organic-inorganic composite film containing the organic resin and the crystalline layered material (hereinafter may be simply referred to as the organic-inorganic composite film), which is a thickness when its cross section is observed with a SEM, is 0.10 µm or more and 2.0 µm or less as an average film thickness. When the average film thickness is less than 0.10 µm, it is difficult to form the film uniformly on the surface of the cold rolled steel sheet. When the average film thickness exceeds 2.0 µm, there is a concern that a spot weldability that is important in automobile manufacture is decreased. The thickness of the organic-inorganic composite film may be measured from a result of observing an FIB-processed cross section with a SEM with an acceleration voltage of 5 kV or less. Identification of a crystal structure about whether the crystalline layered material is crystalline may be performed by thin-film X-ray diffraction.

The crystalline layered material is contained in an amount of 0.5 part by weight or more as a solid with respect to 100 parts by weight of a solid of the organic resin. When the solid of the crystalline layered material is less than 0.5 part by weight, the amount of the crystalline layered material contacting the mold when the mold and the cold rolled steel sheet slide is small, and thus the effect cannot be achieved sufficiently.

In embodiments of the present invention, the crystalline layered material is, from among unit crystal lattices, a crystal in which plate-shaped covalent bond crystals are layered over one another with relatively weak bonding such as an intermolecular force, hydrogen bonding, and electrostatic energy. A layered double hydroxide having a structure representable by $[M^{2+}_{1-x}M^{3+}_x(OH)_2][A^{n-}]_{x/n} \cdot zH_2O$, in particular, has a layered crystal structure, since anions that are negatively charged are bonded with positively charged plate-shaped divalent and trivalent metal hydroxides by electrostatic energy in order to keep electric balance and has stacked layers, and is preferably used as the crystalline layered material of the present invention. Being the layered double hydroxide indicated by $[M^{2+}_{1-x}M^{3+}_x(OH)_2][A^{n-}]_{x/n} \cdot zH_2O$ is known to be identifiable by X-ray diffraction and a substance representable by the formula is known to be a layered crystal.

The $M^{2+}$ is preferably one or more of $Mg^{2+}$, $Ca^{2+}$, $Fe^{2+}$, $Ni^{2+}$, $Zn^{2+}$, $Pb^{2+}$, and $Sn^{2+}$. In particular, $Mg^{2+}$, $Ca^{2+}$, $Fe^{2+}$, $Ni^{2+}$, and $Zn^{2+}$ are more preferable because they have been identified as layered double hydroxide species that are produced naturally or artificially and they are able to exist as layered double hydroxides stably.

The $M^{3+}$ is preferably one or more of $Al^{3+}$, $Fe^{3+}$, $Cr^{3+}$, $3/4Zr^{4+}$, and $Mo^{3+}$. In particular, $Al^{3+}$, $Fe^{3+}$, and $Cr^{3+}$ are more preferable because they have been identified as layered double hydroxide species that are produced naturally or artificially and they are able to exist as layered double hydroxides stably.

The $A^{n-}$ is preferably one or more of $OH^-$, $F^-$, $CO_3^{2-}$, $Cl^-$, $Br^-$, $(C_2O_4)^{2-}$, $I^-$, $(NO_3)^-$, $(SO_4)^{2-}$, $(BrO_3)^-$, $(IO_3)^-$, $(V_{10}O_{28})^{6-}$, $(Si_2O_5)^{2-}$, $(ClO_4)^-$, $(CH_3COO)^-$, $[C_6H_4(CO_2)_2]^{2-}$, $(C_6H_5COO)^-$, $[C_8H_{16}(CO_2)_2]^{2-}$, $n(C_8H_{17}SO_4)^-$, $n(C_{12}H_{25}SO_4)^-$, $n(C_{18}H_{37}SO_4)^-$, and $SiO_4^{4-}$. They have been confirmed to be incorporated as interlayer anions of layered double hydroxides, and they are able to exist as layered double hydroxides. In particular, $OH^-$, $CO_3^{2-}$, $Cl^-$, and $(SO_4)^{2-}$ may be used as the anions more preferably because they are easier to be incorporated as the interlayer anions than other anions of layered double hydroxide species upon film formation on a surface of a cold rolled steels sheet, and the film formation is possible in a short period of time.

Next, a method of producing an organic-inorganic composite film on a surface of a cold rolled steel sheet will be explained. First, a method of producing a crystalline layered material will be described. Herein, a method of producing a layered double hydroxide, which is a crystalline layered material, in a powdery form, will be described as an example. For example, a method of dropping an anion-containing solution into a cation-containing aqueous solution will be described. An aqueous solution containing any one or more anions of inorganic anions or organic anions ($A^{n-}$) is dropped into an aqueous solution containing any one or more of divalent cations ($M^{2+}$) and any one or more of trivalent cations ($M^{3+}$). A 2.0-mole NaOH solution is dropped to adjust the solution so that the pH of the reaction suspension becomes 10±0.1. The divalent cations and trivalent cations present in the reaction suspension exist in a colloidal form as hydroxides. When one or more specific anions from among OH—, $F^-$, $CO_3^{2-}$, $Cl^-$, $Br^-$, $(C_2O_4)^{2-}$, $I^-$, $(NO_3)^-$, $(SO_4)^{2-}$, $(BrO_3)^-$, $(IO_3)^-$, $(V_{10}O_{28})^{6-}$, $(Si_2O_5)^{2-}$, $(ClO_4)^-$, $(CH_3COO)^-$, $[C_6H_4(CO_2)_2]^{2-}$, $C_6H_5COO)^-$, $[C_8H_{16}(CO_2)_2]^{2-}$, $n(C_8H_{17}SO_4)^-$, $n(C_{12}H_{25}SO_4)^-$, $n(C_{18}H_{37}SO_4)^-$, and $SiO_4^{4-}$ are dropped into the suspension, the hydroxides precipitate as a layered double hydroxide. The obtained precipitate is then separated using a centrifugal separator and dried to obtain a powdery layered double hydroxide. Whether the obtained powdery substance is a layered compound may be confirmed by X-ray diffraction.

The powdery layered double hydroxide obtained as described above and the organic resin are then mixed as appropriate and stirred to prepare a coating composition. For stirring, a coating disperser (a sand grinder) may be used, for example. A stirring time is adjusted as appropriate. To sufficiently disperse the powdery layered double hydroxide in an organic solvent, the stirring time is preferably 30 minutes or more. The organic resin may be one or more selected from epoxy resins, polyhydroxy polyether resins, polyester resins, urethane resins, silicone resins, and acrylic resins. From the viewpoint of corrosion resistance, in particular, with respect to an epoxy resin as a base material, its molecular weight is preferably optimized as appropriate or a part of the resin is preferably modified with urethane, polyester, amine, or the like, in order to improve workability.

Furthermore, as needed, an additive may be added, which is one or more of: an organic coloring pigment (for example, a fused polycyclic organic pigment, a phthalocyanine organic pigment, or the like); a coloring dye (for example, a water-soluble azo metallic dye or the like); an inorganic pigment (for example, titanium oxide or the like); a conductive pigment (for example: metallic powder such as zinc, aluminum, or nickel; iron phosphate; antimony-doped tin oxide; or the like); a coupling agent (for example, a titanium coupling agent or the like); a melamine-cyanuric acid adduct; and the like.

Next, the obtained coating composition is applied on the surface of the cold rolled steel sheet and baked. Means for applying the obtained coating composition on the surface of the cold rolled steel sheet is not particularly limited. A roll coater is preferably used. For a heat-drying (baking) treatment, a dryer, a hot stove, a high-frequency induction heating furnace, an infrared furnace, or the like may be used, but from the viewpoint of corrosion resistance, the high-frequency induction heating furnace is particularly preferable. Heat treatment is preferably conducted within a range of 50 to 350° C. or preferably 80 to 250° C. in reached plate temperature. If a heating temperature is less than 50° C., a large amount of a solvent within the film remains and the corrosion resistance becomes insufficient. If the heating temperature exceeds 350° C., it is not only non-economical but also defects may occur in the film and degrade the corrosion resistance. As described, the cold rolled steel sheet having, on a surface thereof, the organic-inorganic composite film containing the organic resin and the crystalline layered material is obtained.

Even if N, Pb, Na, Mn, Ba, Sr, Si, or the like is incorporated into the organic-inorganic composite film due to impurities being contained in the treatment liquid used in the film forming treatment or the like, the effect of the present invention is not impaired.

EXAMPLES

The present invention will be explained in further detail with reference to examples. The layered double hydroxide was produced by dropping an aqueous solution containing any one or more anions of inorganic anions or organic anions ($A^{n-}$) (Composition of Aqueous Solution 2 in Table 1) into an aqueous solution containing any one or more of divalent cations ($M^{2+}$) and any one or more of trivalent cations ($M^{3+}$) listed in Table 1 (Composition of Aqueous Solution 1 in Table 1). A 2.0-mole NaOH solution was dropped therein to adjust the solution so that the pH of the reaction suspension became 10±0.1. The obtained precipitate was then filtered and dried to obtain a powdery layered double hydroxide. It was identified to be a layered double hydroxide by X-ray diffraction.

TABLE 1

| No. | Composition of Aqueous Solution 1 | Composition of Aqueous Solution 2 | Composition of crystalline layered material (layered double hydroxide)(Identification results) |
|---|---|---|---|
| 1 | Magnesium nitrate hexahydrate 113 g/L<br>Aluminum hydrate nonahydrate 83 g/L | Sodium carbonate decahydrate 31 g/L | ICDD card reference code: 01-089-0460<br>$[Mg_{0.667}Al_{0.333}(OH)_2][CO_3^{2-}]_{0.167} \cdot 0.5H_2O$<br>Magnesium Aluminum Hydroxide Carbonate Hydrate |
| 2 | Zinc nitrate heptahydrate 131 g/L<br>Aluminum nitrate nonahydrate 83 g/L | Sodium carbonate decahydrate 31 g/L | ICDD card reference code: 00-048-1021<br>$[Zn_{0.71}Al_{0.28}(OH)_2][CO_3^{2-}]_{0.145} \cdot H_2O$<br>Zinc Aluminum Carbonate Hydroxide Hydrate |
| 3 | Iron(II) sulfate heptahydrate 122 g/L<br>Iron(III) nitrate nonahydrate 89 g/L | Sodium carbonate decahydrate 31 g/L | ICDD card reference code: 00-050-1380<br>$[Fe_{0.67}Fe_{0.33}(OH)_2][CO_3^{2-}]_{0.145} \cdot 0.33H_2O$<br>Iron Carbonate Hydroxide Hydrate |
| 4 | Nickel nitrate hexahydrate 128 g/L<br>Iron(III) nitrate nonahydrate 89 g/L | Sodium sulfate decahydrate 31 g/L | ICDD card reference code: 00-042-0573<br>$[Ni_{0.75}Fe_{0.125}(OH)_2][SO_4^{2-}]_{0.25} \cdot 0.5H_2O$<br>Iron Nickel Sulfate Hydroxide Hydrate |
| 5 | Magnesium nitrate hexahydrate 113 g/L<br>Aluminum hydrate nonahydrate 83 g/L | Sodium hydroxide 5 g/L | ICDD card reference code: 00-038-0478<br>$[Mg_{0.75}Al_{0.25}(OH)_2][OH^-]_{0.25} \cdot 0.5H_2O$<br>Magnesium Aluminum Hydroxide Hydrate |
| 6 | Magnesium nitrate hexahydrate 113 g/L<br>Iron(III) nitrate 89 g/L | Sodium chloride 6 g/L | ICDD card reference code: 00-020-0500<br>$[Mg_{0.75}Fe_{0.25}(OH)_2][Cl^-]_{0.25} \cdot 0.5H_2O$<br>Magnesium Iron Oxide Chloride Hydroxide Hydrate |
| 7 | Calcium nitrate tetrahydrate 104 g/L<br>Aluminum nitrate nonahydrate 83 g/L | Sodium chloride 6 g/L | ICDD card reference code: 00-035-0105<br>$[Ca_{0.67}Al_{0.33}(OH)_2][Cl^-]_{0.33} \cdot 0.67H_2O$<br>Calcium Aluminum Hydroxide Chloride Hydrate |
| 8 | Magnesium nitrate hexahydrate 113 g/L<br>Chromium(III) nitrate nonahydrate 88 g/L | Sodium carbonate decahydrate 31 g/L | ICDD card reference code: 00-045-1475<br>$[Mg_{0.67}Cr_{0.33}(OH)_2][CO_3^{2-}]_{0.157} \cdot 0.5H_2O$<br>Magnesium Chromium Carbonate Hydroxide Hydrate |

TABLE 1-continued

| No. | Composition of Aqueous Solution 1 | Composition of Aqueous Solution 2 | Composition of crystalline layered material (layered double hydroxide)(Identification results) |
|---|---|---|---|
| 9 | Iron(II) sulfate heptahydrate 122 g/L<br>Aluminum nitrate nonahydrate 83 g/L | Sodium carbonate decahydrate 31 g/L | ICDD card reference code: 00-051-1527<br>$[Fe_{0.67}Al_{0.33}(OH)_2][CO_3^{2-}]_{0.157} \cdot 0.5H_2O$<br>Iron Aluminum Oxide Carbonate Hydroxide Hydrate |
| 10 | Nickel nitrate hexahydrate 128 g/L<br>Aluminum nitrate nonahydrate 83 g/L | Sodium carbonate decahydrate 31 g/L | ICDD card reference code: 00-015-0087<br>$[Ni_{0.67}Al_{0.33}(OH)_2][CO_3^{2-}, OH^-]_{0.157} \cdot 0.5H_2O$<br>Nickel Aluminum Oxide Carbonate Hydroxide Hydrate |

The coating compositions to be the organic-inorganic composite films formed on the surfaces were prepared by using organic resins listed in Table 2 as resin compositions, mixing the layered double hydroxides produced by the above-described method thereinto as listed in Table 3, and stirring using a coating disperser (a sand grinder) for 45 minutes.

TABLE 2

| No. | Classification | Base resin |
|---|---|---|
| 1 | Thermosetting resin | Amine-modified epoxy resin/Blocked isocyanate cured |
| 2 | | Urethane-modified epoxy resin/Blocked isocyanate cured |
| 3 | | Epichlorohydrin type epoxy resin/Blocked isocyanate cured |
| 4 | | Polyester type urethane resin/Melamine cured |
| 5 | Water-dispersible resin | Ionomer of ethylene-acrylic acid copolymer |
| 6 | | Ethylene-acrylic copolymer (Emulsion polymerization) |
| 7 | | Styrene-acrylic copolymer |
| 8 | | Polyurethane resin |

As a steel sheet for a substrate of a coating, a cold rolled steel sheet with a plate thickness of 0.7 mm that had been subjected to temper rolling was used. The surface of the cold rolled steel sheet obtained as described above was subjected to an alkaline degreasing treatment, washed with water, and dried, and thereafter, the above-described coating composition was applied thereon by a roll coater and baked (heat dried) at a baking temperature of 140° C. as listed in Table 3. The film thickness of the organic-inorganic composite film was adjusted by the solid content of the coating composition (heating residue) or a coating condition (e.g., a roll force, a roll rotational speed, or the like).

The average film thicknesses of the organic-inorganic composite films on the surfaces of the cold rolled steel sheets obtained as described above were measured, and the layered double hydroxides were identified. As a method for evaluating press formability indicating the ease of elaborate press forming, measurement of kinetic friction coefficients and evaluation of mold galling resistances were conducted. Each measurement method and identification method are as follows.

(1) Method of Measuring the Average Film Thickness of the Organic-Inorganic Composite Film A cross section of a film was sputtered at 45 degrees using an FIB, the cross section was observed with an ultra-low acceleration SEM, 10 points were extracted and measured, and an average value thereof was regarded as an average film thickness of that film.

(2) Method of Identifying the Layered Double Hydroxides

Presence of the crystalline layered double hydroxides was identified by an X-ray diffraction method. Peaks obtained by the X-ray diffraction method using a Cu—Kα radiation were compared with ICDD cards to identify the layered double hydroxides. The matched cards were as follows.

(a) Magnesium Aluminum Hydroxide Carbonate Hydrate
ICDD card reference code: 01-089-0460
$[Mg_{0.667}Al_{0.333}(OH)_2][CO_3^{2-}]_{0.167} \cdot 0.5H_2O$
(b) Zinc Aluminum Carbonate Hydroxide Hydrate
ICDD card reference code: 00-048-1021
$[Zn_{0.71}Al_{0.29}(OH)_2][CO_3^{2-}]_{0.145} \cdot H_2O$
(c) Iron Carbonate Hydroxide Hydrate
ICDD card reference code: 00-050-1380
$[Fe_{0.67}Fe_{0.33}(OH)_2][CO_3^{2-}]_{0.145} \cdot 0.33H_2O$
(d) Iron Nickel Sulfate Hydroxide Hydrate
ICDD card reference code: 00-042-0573
$[Ni_{0.75}Fe_{0.25}(OH)_2][SO_4^{2-}]_{0.125} \cdot 0.5H_2O$
(e) Magnesium Aluminum Hydroxide Hydrate
ICDD card reference code: 00-038-0478
$[Mg_{0.75}Al_{0.25}(OH)_2][OH^-]_{0.25} \cdot 0.5H_2O$
(f) Magnesium Iron Oxide Chloride Hydroxide Hydrate
ICDD card reference code: 00-020-0500
$[Mg_{0.75}Fe_{0.25}(OH)_2][Cl^-]_{0.25} \cdot 0.5H_2O$
(g) Calcium Aluminum Hydroxide Chloride Hydrate
ICDD card reference code: 00-035-0105
$[Ca_{0.67}Al_{0.33}(OH)_2][Cl^-]_{0.33} \cdot 0.67H_2O$
(h) Magnesium Chromium Carbonate Hydroxide Hydrate
ICDD card reference code: 00-045-1475
$[Mg_{0.67}Cr_{0.33}(OH)_2][CO_3^{2-}]_{0.157} \cdot 0.5H_2O$
(i) Iron Aluminum Oxide Carbonate Hydroxide Hydrate
ICDD card reference code: 00-051-1527
$[Fe_{0.67}Al_{0.33}(OH)_2][CO_3^{2-}]_{0.157} \cdot 0.5H_2O$
(j) Nickel Aluminum Oxide Carbonate Hydroxide Hydrate
ICDD card reference code: 00-015-0087
$[Ni_{0.67}Al_{0.33}(OH)_2][CO_3^{2-}, OH^-]_{0.157} \cdot 0.5H_2O$ (3) Method of Measuring the Kinetic Friction Coefficients To evaluate the press formability (in particular, the press formability in drawing and inflow portions) the kinetic friction coefficient of each sample was measured as follows. FIG. 1 is a schematic front view illustrating a friction coefficient measuring apparatus. As illustrated in the figure, a kinetic friction coefficient measuring specimen 1 taken from a sample is fixed to a specimen stand 2, and the specimen stand 2 is fixed to an upper surface of a slide table 3, which is horizontally movable. On a lower surface of the slide table 3, a slide table support 5, which has rollers 4 contacting the lower surface and is vertically movable, is provided, and a first load cell 7 for measuring a pressing load N to the kinetic friction coefficient measuring specimen 1 from a bead 6 by pushing up the slide table support 5 is attached to the slide table support 5. To measure a sliding resistance force N for moving the slide table 3 horizontally with the above-described pressing force being acted, a second load cell 8 is attached to one end of the slide table 3. As a lubricating oil, the PRETON R352L manufactured by Sugimura Chemical Industrial Co., Ltd. was applied on the surface of the kinetic friction coefficient measuring specimen 1 to conduct tests.

Figure 2:
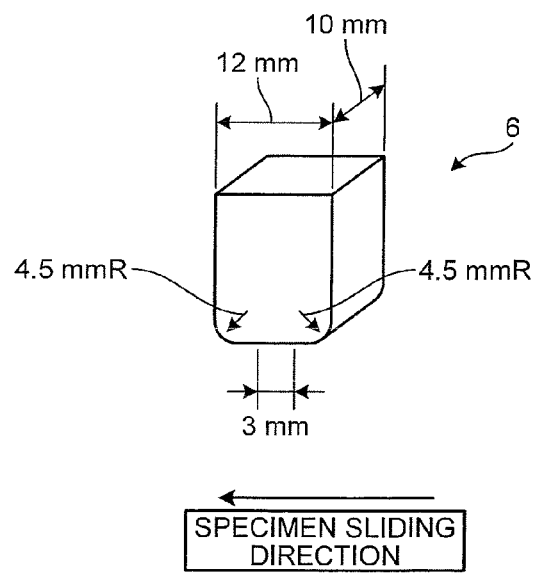
FIG. 2 is a schematic perspective view illustrating a first shape and dimensions of a bead 6 in FIG. 1 (bead shape 1).

FIG. 2 is a schematic perspective view illustrating a first shape and dimensions of the bead 6 used (hereinafter, bead shape 1). It is slid with a bottom surface of the bead 6 pressed against the surface of the kinetic friction coefficient measuring specimen 1. The shape of the bead 6 illustrated in FIG. 2 is formed of: a width of 10 mm; a length in a specimen sliding direction of 12 mm; and curved surfaces with a curvature of 4.5 mmR at portions of both ends in the sliding direction, and the bead's bottom surface, against which the specimen is pressed, has a plane with a width of 10 mm and a length in the sliding direction of 3 mm.

Figure 3:
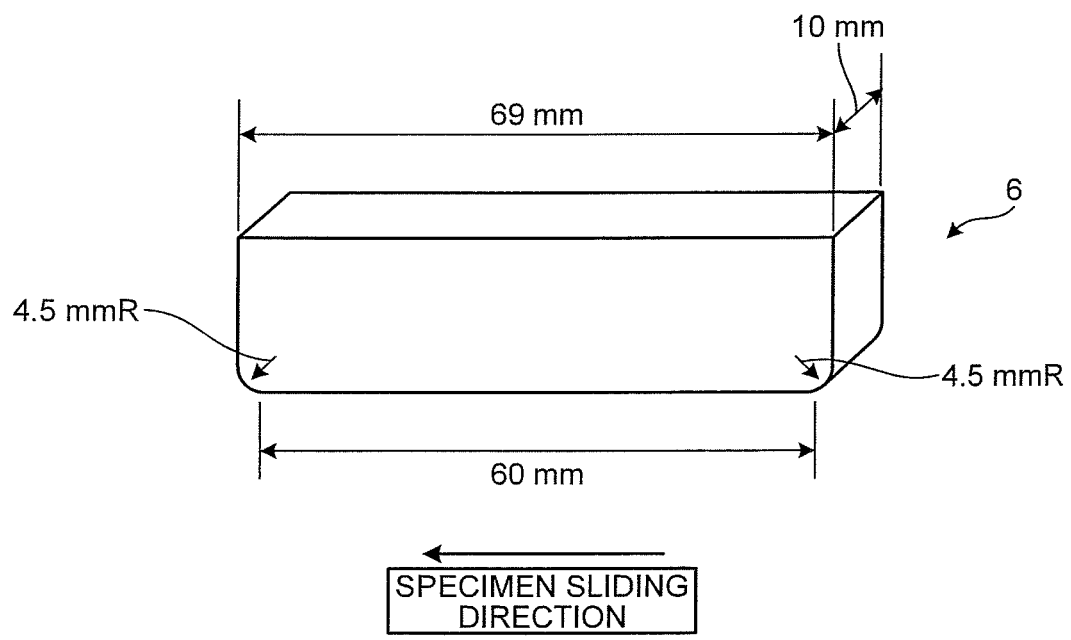
FIG. 3 is a schematic perspective view illustrating a second shape and dimensions of the bead 6 in FIG. 1 (bead shape 2).

FIG. 3 is a schematic perspective view illustrating a second shape and dimensions of the bead 6 used (hereinafter, bead shape 2). It is slid with a bottom surface of the bead 6 pressed against the surface of the kinetic friction coefficient measuring specimen 1. The shape of the bead 6 illustrated in FIG. 3 is formed of: a width of 10 mm; a length in the specimen sliding direction of 69 mm; and curved surfaces with a curvature of 4.5 mmR at lower portions of both ends in the sliding direction, and the bead's bottom surface against which the specimen is pressed has a plane with a width of 10 mm and a length in the sliding direction of 60 mm.

The measurement of kinetic friction coefficients was conducted under three conditions in which the pressing loads N were 400, 1200, and 1600 kgf at room temperature (25° C.) so that contact pressures supposing press forming of a high-strength steel sheet are exerted. The specimens' drawing speed (a horizontal moving speed of the slide table 3) was 100 cm/min or 20 cm/min. Under these conditions, the pressing load N and the sliding resistance force F were measured, and the kinetic friction coefficient $\mu$ between the sample and the bead 6 was calculated by the equation: $\mu=F/N$.

Combinations of the bead shape, pressing load, and drawing speed are as follows:
Condition 1: Bead shape 1, a pressing load of 400 kgf, and a drawing speed of 100 cm/min
Condition 2: Bead shape 1, a pressing load of 1200 kgf, and a drawing speed of 100 cm/min
Condition 3 Bead shape 1, a pressing load of 1600 kgf, and a drawing speed of 100 cm/min
Condition 4: Bead shape 2, a pressing load of 400 kgf, and a drawing speed of 20 cm/min Method of Evaluating Mold Galling Resistance In addition to the kinetic friction coefficient, in cold rolled steel sheets, mold galling is likely to occur because a cold rolled steel sheet and a mold adhere to each other in portions having a long sliding distance and the sliding resistance increases. Using the friction coefficient measuring apparatus illustrated in FIG. 1, therefore, sliding tests were repeated 50 times, and mold galling resistance was evaluated, with a count of how many repeated times the kinetic friction coefficient increased by 0.01 or more being regarded as a repeat count of mold galling occurrences. If no increase in the kinetic friction coefficient was recognized even after the sliding tests were repeated 50 times, the repeat count was regarded as 50 times or more. The test were conducted, like the above-described (3) method of measuring the kinetic friction coefficient, under the above-described conditions 1 to 3 so that a contact pressure supposing press forming of a high-strength steel sheet was realized.

The test results thus obtained are listed in Table 3 with the conditions.

TABLE 3

| | | | Surface film layer | | | | | Kinetic friction coefficient | | | | Mold galling resistance | | |
| | | | Organic resin | | Crystalline layered material | | Average film thickness ($\mu$m) | Baking temperature (° C.) | | | | | | | |
| Category | No. | Steel sheet type | Type *2 | Amount *3 | Compound type *1 | Amount *3 | | | Condition 1 | Condition 2 | Condition 3 | Condition 4 | Condition 1 | Condition 2 | Condition 3 |
| Comparative Example | 1 | Cold rolled steel sheet | 1 | 100 | — | — | 1.0 | 140 | 0.137 | 0.093 | —*4 | 0.171 | 50 or more | 5 | 0 |
| Inventive Example | 2 | | 1 | 100 | 1 | 20 | 1.0 | 140 | 0.082 | 0.065 | 0.057 | 0.142 | 50 or more | 32 | 22 |
| Inventive Example | 3 | | 1 | 100 | 2 | 20 | 1.0 | 140 | 0.080 | 0.064 | 0.057 | 0.142 | 50 or more | 33 | 23 |
| Inventive Example | 4 | | 1 | 100 | 3 | 20 | 1.0 | 140 | 0.081 | 0.066 | 0.056 | 0.143 | 50 or more | 30 | 20 |
| Inventive Example | 5 | | 1 | 100 | 4 | 20 | 1.0 | 140 | 0.079 | 0.064 | 0.056 | 0.142 | 50 or more | 31 | 21 |
| Inventive Example | 6 | | 1 | 100 | 5 | 20 | 1.0 | 140 | 0.078 | 0.064 | 0.056 | 0.143 | 50 or more | 33 | 20 |
| Inventive Example | 7 | | 1 | 100 | 6 | 20 | 1.0 | 140 | 0.080 | 0.064 | 0.057 | 0.140 | 50 or more | 35 | 20 |
| Inventive Example | 8 | | 1 | 100 | 7 | 20 | 1.0 | 140 | 0.081 | 0.065 | 0.057 | 0.142 | 50 or more | 29 | 23 |
| Inventive Example | 9 | | 1 | 100 | 8 | 20 | 1.0 | 140 | 0.079 | 0.065 | 0.058 | 0.142 | 50 or more | 28 | 23 |
| Inventive Example | 10 | | 1 | 100 | 9 | 20 | 1.0 | 140 | 0.080 | 0.065 | 0.058 | 0.143 | 50 or more | 31 | 25 |
| Inventive Example | 11 | | 1 | 100 | 10 | 20 | 1.0 | 140 | 0.080 | 0.066 | 0.057 | 0.140 | 50 or more | 30 | 22 |
| Inventive Example | 12 | | 2 | 100 | 1 | 20 | 1.0 | 140 | 0.080 | 0.065 | 0.057 | 0.141 | 50 or more | 32 | 22 |
| Inventive Example | 13 | | 3 | 100 | 1 | 20 | 1.0 | 140 | 0.082 | 0.064 | 0.056 | 0.141 | 50 or more | 33 | 22 |
| Inventive Example | 14 | | 4 | 100 | 1 | 20 | 1.0 | 140 | 0.081 | 0.065 | 0.057 | 0.140 | 50 or more | 35 | 23 |
| Inventive Example | 15 | | 5 | 100 | 1 | 20 | 1.0 | 140 | 0.079 | 0.065 | 0.058 | 0.140 | 50 or more | 33 | 26 |
| Inventive Example | 16 | | 6 | 100 | 1 | 20 | 1.0 | 140 | 0.080 | 0.065 | 0.056 | 0.140 | 50 or more | 32 | 25 |

TABLE 3-continued

| | | Surface film layer | | | | | | Kinetic friction coefficient | | | | Mold galling resistance | | |
| | | Steel sheet type | Organic resin | | Crystalline layered material | | Average film thickness (μm) | Baking temperature (°C.) | Con-dition 1 | Condi-tion 2 | Con-dition 3 | Con-dition 4 | Con-dition 1 | Condi-tion 2 | Con-dition 3 |
| Category | No. | | Type *2 | Amount *3 | Compound type *1 | Amount *3 | | | | | | | | | |
| --- | --- | --- | --- | --- | --- | --- | --- | --- | --- | --- | --- | --- | --- | --- | --- |
| Inventive Example | 17 | | 7 | 100 | 1 | 20 | 1.0 | 140 | 0.081 | 0.064 | 0.056 | 0.140 | 50 or more | 29 | 22 |
| Inventive Example | 18 | | 8 | 100 | 1 | 20 | 1.0 | 140 | 0.081 | 0.066 | 0.056 | 0.142 | 50 or more | 28 | 24 |
| Inventive Example | 19 | | 1 | 100 | 1 | 0.5 | 1.0 | 140 | 0.091 | 0.070 | 0.061 | 0.162 | 50 or more | 20 | 10 |
| Inventive Example | 20 | | 1 | 100 | 1 | 1 | 1.0 | 140 | 0.088 | 0.069 | 0.062 | 0.155 | 50 or more | 21 | 12 |
| Inventive Example | 21 | | 1 | 100 | 1 | 10 | 1.0 | 140 | 0.085 | 0.067 | 0.060 | 0.150 | 50 or more | 25 | 16 |
| Inventive Example | 22 | | 1 | 100 | 1 | 100 | 1.0 | 140 | 0.075 | 0.060 | 0.053 | 0.134 | 50 or more | 50 or more | 50 or more |
| Inventive Example | 23 | | 1 | 100 | 1 | 120 | 1.0 | 140 | 0.075 | 0.059 | 0.052 | 0.129 | 50 or more | 50 or more | 50 or more |
| Inventive Example | 24 | | 1 | 100 | 1 | 20 | 0.1 | 140 | 0.091 | 0.070 | 0.055 | 0.162 | 50 or more | 20 | 10 |
| Inventive Example | 25 | | 1 | 100 | 1 | 20 | 0.5 | 140 | 0.086 | 0.059 | 0.052 | 0.155 | 50 or more | 21 | 12 |
| Inventive Example | 26 | | 1 | 100 | 1 | 20 | 1.5 | 140 | 0.076 | 0.060 | 0.053 | 0.134 | 50 or more | 50 or more | 42 |
| Inventive Example | 27 | | 1 | 100 | 1 | 20 | 2.0 | 140 | 0.072 | 0.059 | 0.052 | 0.129 | 50 or more | 50 or more | 50 or more |

*1: Number of a crystalline layered material listed in Table 1
*2: Number of an organic resin listed in Table 2
*3: Part(s) by weight (solid content) wt %
*4: Immeasurable due to occurrence of mold galling The following has become clear from the test results listed in Table 3. No. 1 is an example not containing a crystalline layered material and a comparative example with respect to the present invention. The comparative example has high kinetic friction coefficients and poor mold galling resistances. Nos. 2 to 27 are examples containing organic resins and crystalline layered materials and are examples of the present invention. The inventive examples of Nos. 2 to 27 have lower kinetic friction coefficients and better mold galling resistances than the comparative example of No. 1.

The cold rolled steel sheet of the present invention is excellent in press formability; and therefore applicable in wide-ranging fields with a focus on uses in automotive bodies requiring difficult-to-form materials.

REFERENCE SIGNS LIST

1 Friction coefficient measuring specimen
2 Specimen stand
3 Slide table
4 Rollers
5 Slide table support
6 Bead
7 First load cell
8 Second load cell
9 Rail
N Pressing load
F Sliding resistance force

The invention claimed is:

1. A cold rolled steel sheet comprising, on a surface thereof, an organic-inorganic composite film containing: an organic resin; and a crystalline layered material, wherein the organic-inorganic composite film has an average film thickness of 0.10 to 2.0 μm and contains 0.5 part or more by weight of the crystalline layered material as a solid with respect to 100 parts by weight of a solid of the organic resin, wherein the crystalline layered material is a layered double hydroxide represented by $[M^{2+}_{1-x}M^{3+}_{x}(OH)_2][A^{n-}]_{x/n} \cdot zH_2O$, wherein:

$M^{2+}$ is one or more of $Mg^{2+}$, $Ca^{2+}$, $Fe^{2+}$, $Ni^{2+}$, $Zn^{2+}$, $Pb^{2+}$, and $Sn^{2+}$;

$M^{3+}$ is one or more of $Al^{3+}$, $Fe^{3+}$, $Cr^{3+}$, $3/4Zr^{4+}$, and $Mo^{3+}$; and $A^{n-}$ is one or more of $(C_2O_4)^{2-}$, $I^-$, $(BrO_3)^-$, $(IO_3)^-$, $(V_{10}O_{28})^{6-}$, $(Si_2O_5)^{2-}$, $(ClO_4)^-$, $(CH_3COO)^-$, $[C_6H_4(CO_2)_2]^{2-}$, $(C_6H_5COO)^-$, $[C_8H_{16}(CO_2)_2]^{2-}$, $n(C_8H_{17}SO_4)^-$, $n(C_{12}H_{25}SO_4)^-$, $n(C_{18}H_{37}SO_4)^-$, and $SiO_4^{4-}$, wherein $0 < x \leq 0.33$, $1 \leq n \leq 2$, and $0.33 \leq z \leq 1$, and wherein a base material of the cold rolled steel sheet has a strength exceeding 440 MPa.

2. The cold rolled steel sheet according to claim 1, wherein the organic resin is one or more selected from an epoxy resin, a polyhydroxy polyether resin, a polyester resin, a urethane resin, a silicone resin, and an acrylic resin.

* * * * *